United States Patent [19]
Pellosie, Jr. et al.

[11] Patent Number: 5,015,188
[45] Date of Patent: May 14, 1991

[54] THREE DIMENSIONAL TACTICAL ELEMENT SITUATION (3DTES) DISPLAY

[75] Inventors: John C. Pellosie, Jr., Orlando, Fla.; Michael W. Haas, Beavercreek; Kenneth Aldrich, Dayton, both of Ohio

[73] Assignee: The United States of America as represented by the Secretary of the Air Force, Washington, D.C.

[21] Appl. No.: 456,227

[22] Filed: Dec. 26, 1989

Related U.S. Application Data

[63] Continuation-in-part of Ser. No. 197,053, May 3, 1988, abandoned.

[51] Int. Cl.$^5$ .............................................. G09B 9/00
[52] U.S. Cl. ...................................... 434/38; 364/521
[58] Field of Search ................. 340/705, 724; 358/88, 358/98; 434/43, 44, 38; 350/346, 37

[56] References Cited

U.S. PATENT DOCUMENTS

| | | | |
|---|---|---|---|
| 3,212,084 | 10/1965 | Garrison | 343/7.9 |
| 4,313,726 | 2/1982 | Chase | 434/43 |
| 4,384,338 | 5/1983 | Bennett | 364/522 |
| 4,398,799 | 8/1983 | Swift | 434/43 |
| 4,549,275 | 10/1985 | Sukonick | 364/521 |
| 4,588,992 | 5/1986 | Clark | 343/10 |
| 4,600,200 | 7/1986 | Oka et al. | 273/313 |
| 4,609,993 | 9/1986 | Shimizu | 364/522 |
| 4,634,384 | 1/1987 | Neves et al. | 434/44 |
| 4,641,255 | 2/1987 | Hohmann | 364/522 |
| 4,667,236 | 5/1987 | Dresdner | 358/160 |
| 4,743,200 | 5/1988 | Welch et al. | 434/43 |
| 4,754,269 | 6/1988 | Kishi et al. | 340/724 |
| 4,878,046 | 10/1989 | Smith | 340/705 |
| 4,884,135 | 11/1989 | Schiffman | 340/705 |
| 4,900,133 | 2/1990 | Berman | 350/346 |

Primary Examiner—Richard J. Apley
Assistant Examiner—Glenn E. Richman
Attorney, Agent, or Firm—Charles E. Bricker; Donald J. Singer

[57] ABSTRACT

A two dimensional or flat image display format for showing on an aircraft pilot's helmet mounted display the position of the aircraft relative to other aerial objects in three dimensional space is disclosed. The display format switches, under pilot control, among a variety of different, primarily three dimensional perspective, views. The disclosed views include a generally top-down first view from above the primary object showing the primary object generally at the center of said first view surrounded by the one or more other objects; a generally behind-forward perspective second view from behind the primary object showing the primary object generally at the center of said second view surrounded by the one or more other objects; and, a generally inside out third view from the primary object at the center of said third view showing those one or more other objects surrounding the primary object that are generally inside a solid angle defined by said third view. The displayed positions of the one or more other objects automatically change in response to rotation of the primary object to maintain a front-forward direction of the primary object in the first and second views. In the third view, the displayed positions of the one or more other objects change, under operator control of an apparent viewing orientation, so that the third view approximates an actual out-the-window view from the primary object.

18 Claims, 6 Drawing Sheets

THREE DIMENSIONAL TACTICAL ELEMENT SITUATION (3DTES) DISPLAY

RIGHTS OF THE GOVERNMENT

The invention described herein may be manufactured and used by or for the Government of the United States for all governmental purposes without the payment of any royalty.

This application is a continuation-in-part of application Ser. No. 07/197,053, filed May 3, 1988, abandoned.

BACKGROUND OF THE INVENTION

The invention relates generally to aircraft cockpit displays, and more specifically to a cockpit display that shows a three dimensional tactical situation on a flat image display.

Modern military aircraft have available many different sensors for determining the position and type of tactical threats and targets surrounding the aircraft and pilot. While some of this information, particularly the presence (even if without directional information) of an immediate threat, can be given to the pilot very quickly, it is very difficult to impart the entire three dimensional tactical situation surrounding the aircraft without overwhelming the pilot. Fighter pilots prize and are highly trained to develop their situational awareness (SA). Yet, they frequently complain of an inability to deal with all the information being presented and often turn off or ignore/many of their systems to reduce the informational "clutter" to more manageable proportions.

Newer, more powerful, on-board computers for aircraft, and newer display hardware and software, now make possible much greater levels of preprocessing of the raw sensor data received by the aircraft and manipulating that data to generate sophisticated displays that will provide maximum information in a manner which fighter pilots can quickly understand and use. Unfortunately, despite many advances, the prior art has thus far failed to take full advantage of these new computing capabilities and has not provided a successful example of such a display.

One problem in providing a quickly understandable and useful display is that fighter pilots are individuals and have different abilities and preferences for methods of presenting information that they can use. While pilots may choose which displays they pay particular attention to, they lose the benefit of other information which may be useful to them, but which is hidden with other, not as useful, information in a not chosen display.

Another problem is that different information, and displays, are useful at different times. Switching attention from one display to another disorients the pilot for a period of time.

A pilot's tactical situation is three dimensional. Unfortunately, the output formats of most aircraft displays are still only two dimensional flat images. Notwithstanding, flat image displays have undergone large improvements in recent years. Heads-up displays, or HUD's, project a see-through display of selected important information over the instrument panel in front of the pilot. Another development, the helmet mounted display, or HMD, projects a see-through display that appears to float in front of the pilot's eyes and rotates along several axes in response to head and helmet movement to maintain an apparent position of the display at a fixed location on or near the instrument panel.

It is thus seen that there is a need for a computer generated display that provides a pilot, in a flat image display format, information that efficiently communicates, without overwhelming a complete awareness of the surrounding tactical situation.

It is, therefore, a principal object of the present invention to provide a display, capable of being computer generated, that provides a pilot in a flat image display format complete awareness of the surrounding tactical situation.

It is another object of the present invention to provide in a flat image display format a three dimensional view.

It is yet another object of the present invention to provide a variety of different views to meet different needs of different pilots, or operators, at different times and in different tactical situations.

It is a further object of the present invention to provide a display format that is easily adapted for improving the effectiveness of other detecting and tracking tasks.

It is an advantage of the present invention that moving among different views is made substantially without disorienting discontinuous steps or jumps.

SUMMARY OF THE INVENTION

In accordance with the foregoing principles, objects and advantages, the present invention provides a novel very informative and very understandable two dimensional display for providing a pilot, or other operator, a complete awareness of the surrounding tactical situation. The unique discovery of the present invention is that this requirement, including the problem of different needs of different pilots at different times, is solved by a display format that switches among, under pilot control, a variety of different, primarily three dimensional perspective, views.

Accordingly, the invention is directed to an apparatus and method for a flat image display format for showing the position of a primary object relative to one or more other objects in three dimensional space, wherein a plurality of displayed views may, under operator control, be transformed in substantially continuous steps between a generally top-down first view from above the primary object showing the primary object generally at the center of said first view surrounded by the one or more other objects; and, a generally behind-forward perspective second view from behind the primary object showing the primary object generally at the center of said second view surrounded by the one or more other objects; wherein, in any view, the displayed positions of the one or more other objects automatically change in response to rotation of the primary object to maintain a front-forward orientation of the primary object.

The display format may additionally include a generally inside-out third view from the primary object at the center of said third view showing those one or more other objects surrounding the primary object that are generally inside a solid angle defined by said third view, wherein the displayed positions of the one or more other objects change, under operator control of an apparent viewing orientation, so that said third view approximates an actual view from the primary object.

The display format may also include border lines for defining boundaries of a view, displayed concentric circles in the plane of a defined boundary for indicating relative radial distances among the primary object and one or more other objects, displayed radial lines from a center of the concentric circles to each of a point of projection from each of the primary object and one or more other objects onto the plane of the concentric circles and displayed parallel lines, wherein one line each connects the primary object and one or more other objects to the plane of a defined boundary for indicating relative distances among the primary object and one or more other objects.

The displayed concentric circles and parallel lines may be scaled to represent actual distances.

The invention further includes the flat image display format specifically for showing on an aircraft pilot's helmet mounted display the position of the aircraft relative to one or more other aerial objects in three dimensional space.

DESCRIPTION OF THE DRAWINGS

The invention will be more clearly understood from a reading of the following detailed description in conjunction with the accompanying drawings wherein.

DETAILED DESCRIPTION

Figure 1:
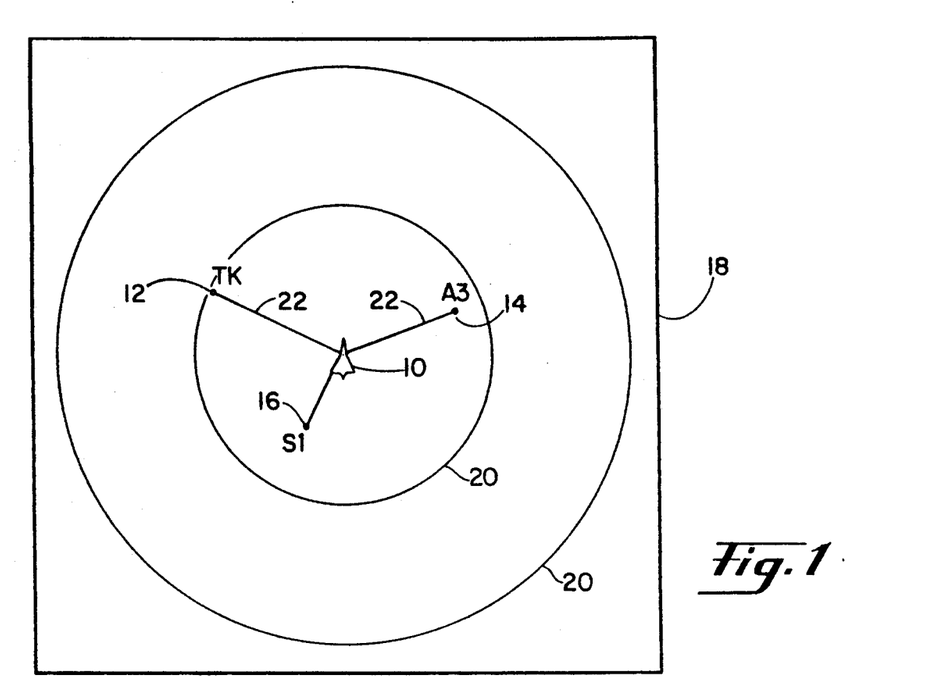
FIG. 1 shows an example flat image display of a top-down configuration one view of an aircraft and surrounding objects in three dimensional space according to the teachings of the present invention.

Referring now to FIG. 1 of the drawings, there is shown an example representational top-down, or configuration one, view of an aircraft 10 and surrounding other objects 12, 14 and 16 in three dimensional space according to the teachings of the present invention. The view may be shown on any typical computer type flat image display, but is preferably shown on a helmet mounted display, or the like, that provides for changing the display in response to head movement. Such a display facilitates the presentation of a configuration three view, as is more fully explained below.

Aircraft 10 is represented in the view by a small airplane symbol so that its orientation is readily determined.

Objects 12, 14 and 16 may represent any threat, target or other object of interest to the pilot that may be located by radar or other aircraft sensors. They are identified on the view by letters assigned by the computer system according to a set of arbitrarily preselected rules. For example, the letters "TK" identify object 12 as a tank. The character of each object may also be indicated by the shape or other characteristic of the displayed symbol used for the object.

The configuration on view of FIG. 1 includes borders 18 defining the boundaries of the visible portions of the display, within which are shown concentric circles 20 and radial lines 22 for showing the relative distances among aircraft 10 and objects 12, 14 and 16. Concentric circles 20 and radial lines 22 are preferably scaled to indicate actual distances.

Figure 5:
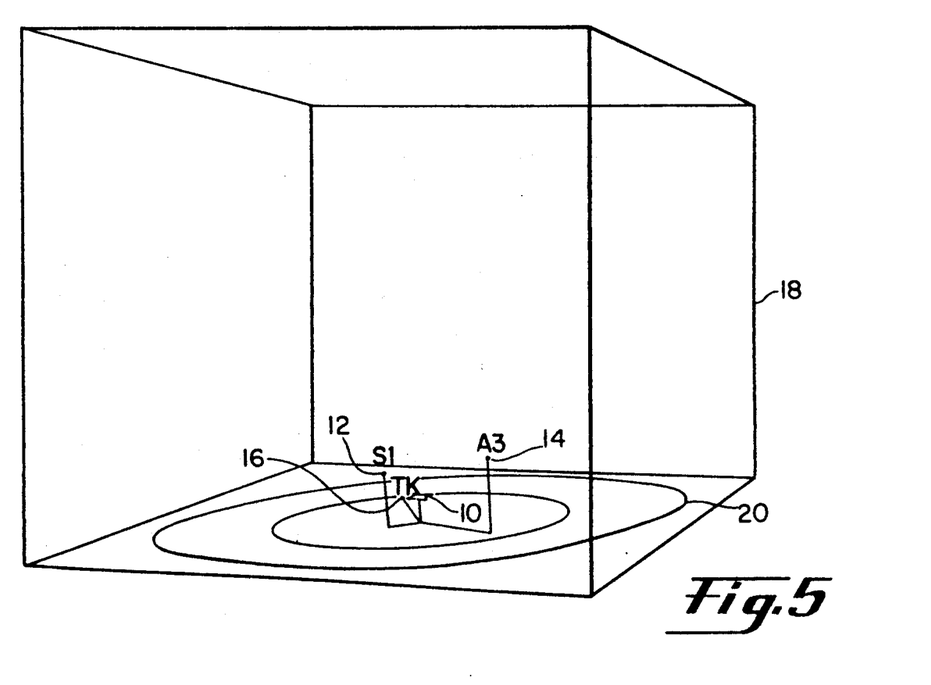
FIG. 5 shows the example display in a configuration two view.

FIG. 5 shows an example of a behind-forward configuration two view of aircraft 10 and surrounding objects 12, 14 and 16. Borders 18 for the configuration two view define a vanishing point perspective view that aids in quickly determining relative positions in three dimensional space of aircraft 10 and surrounding objects 12, 14 and 16. Vertical lines 24 indicate the relative vertical separations among aircraft 10 and objects 12, 14 and 16.

Figure 2:
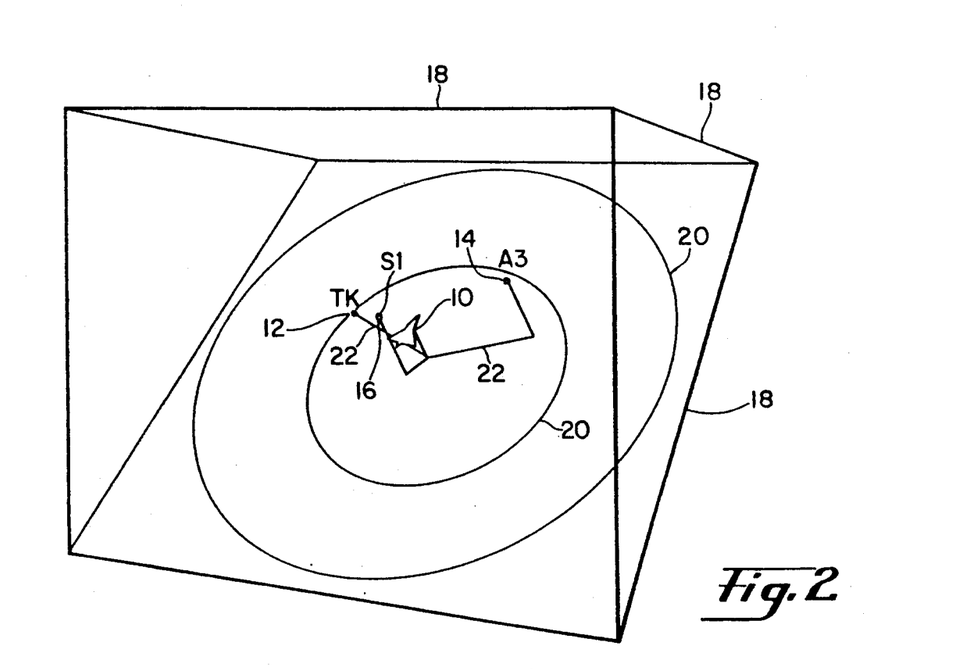
FIG. 2 shows the example display beginning a transformation from a configuration one view into a perspective behind-forward configuration two view.
Figure 3A:
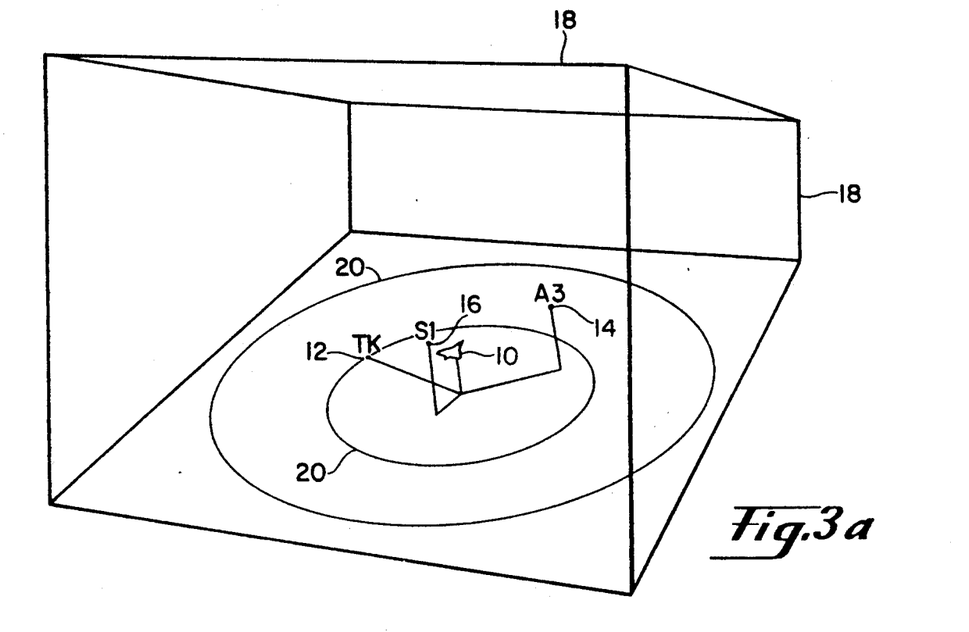
FIG. 3a shows the example display further continuing its transformation from a configuration one view into a configuration two view.
Figure 4:
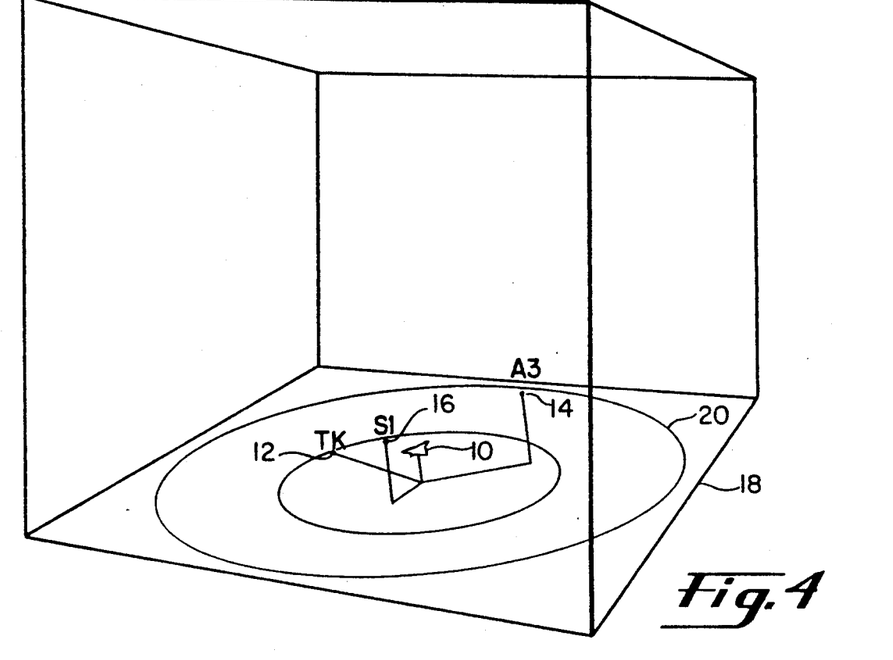
FIG. 4 shows the example display nearly completing its transformation from a configuration one view into a configuration two view.

FIGS. 2–4 show the example display in sequential stages of transformation from the configuration one view of FIG. 1 to the configuration two view of FIG. 5. The transformations, from FIG. 1 to FIG. 2, FIG. 2 to FIG. 3a, FIG. 3a to FIG. 4 and FIG. 4 to FIG. 5, are made under pilot control, preferably by a switch mounted on a cockpit joystick. The switch is preferably a momentary switch so that the pilot may quickly go on to other tasks after initiating a transformation. A transformation typically starts at one end configuration and ends at another. The display may be stopped at in-between configurations by another momentary switch actuation, or programmed to stop at particular favorite in-between transformation positions pre-selected for high comprehensibility by a particular pilot or operator.

The slightly offset perspective viewing angle for the views shown in FIGS. 2–5 is chosen so that the shape and orientation of the aircraft and other object symbols remains determinable throughout the transformations.

Figure 3B:
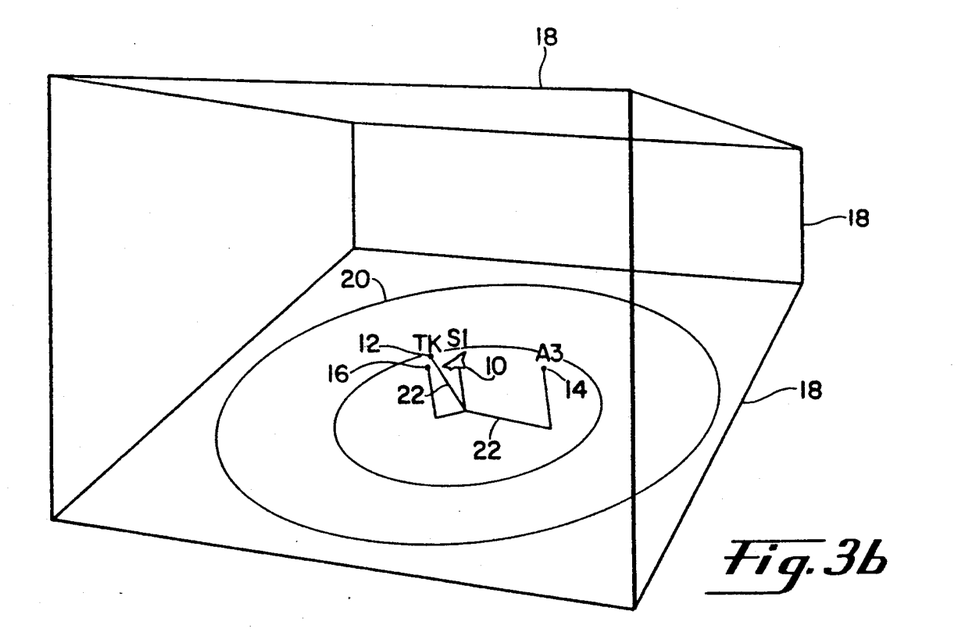
FIG. 3b shows resulting changes in the FIG. 3a display from a rotation of the aircraft in a horizontal plane.

FIGS. 3a and 3b show an example automatic change in the display from a thirty degree counter-clockwise horizontal rotation of aircraft 10 in actual space. The display changes the positions of objects 12, 14 and 16 so that the apparent orientation of aircraft 10 remains front-forward.

Figure 6:
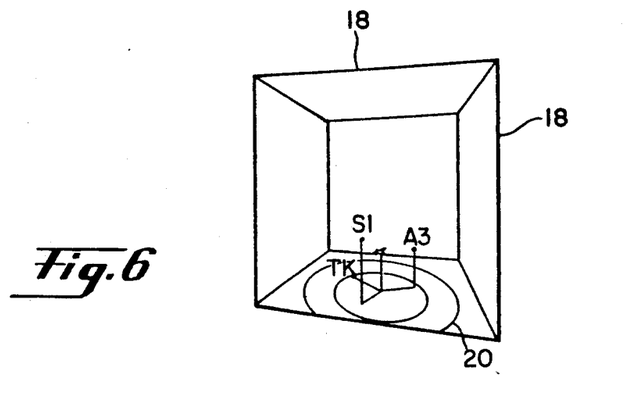
FIG. 6 shows the example display beginning a transformation from a behind-forward configuration two view to an inside-out configuration three view.

FIG. 6 shows the example display beginning a transformation from a behind-forward configuration two view to an inside-out configuration three view. The transformation may best be understood by imagining the eyes of the pilot or observer being brought forward toward aircraft 10 in the center of the display until the view becomes the fully inside-out, with the eye of the observer looking forward out from aircraft 10, configuration three view of FIG. 8.

Figure 7:
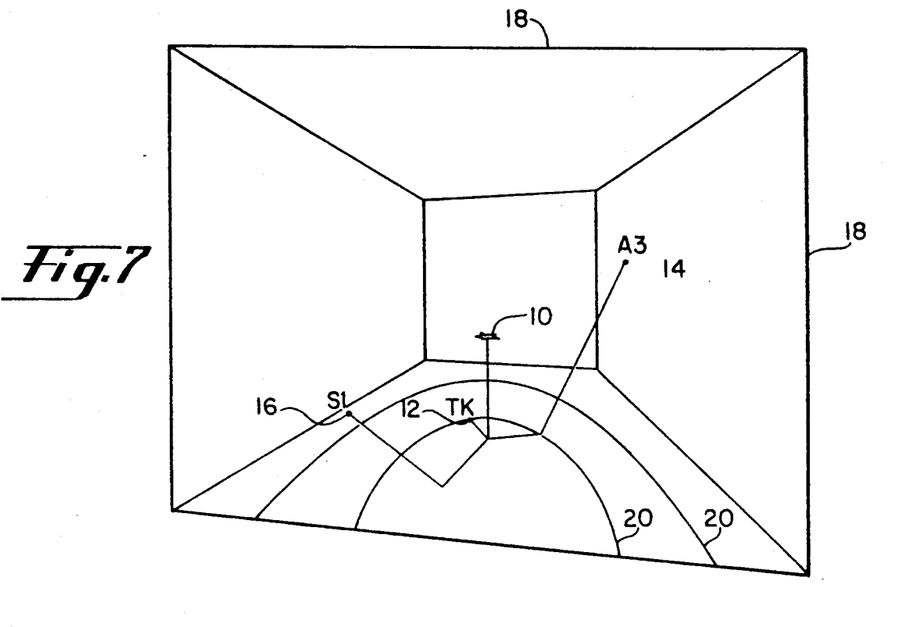
FIG. 7 shows the example display nearly completing its transformation from a configuration two view into a configuration three view; and, FIG. 8 shows the example display in a configuration three view.
Figure 8:
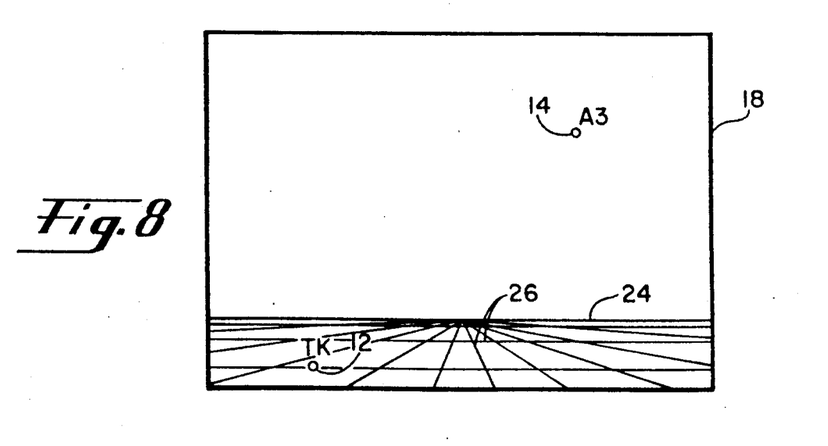

FIG. 7 shows the display nearly completing its transformation from its configuration two view into its FIG. 8 configuration three view.

FIG. 8 is a forward looking configuration three view from aircraft 10. The view approximates an actual view from the aircraft, enhanced by the ability of electronic sensors to detect and track threats and targets beyond normal eyesight limits, and is, therefore, limited to a generally conical, or as truncated slightly to accomodate squared borders, solid angle of about 170 degrees. Accordingly, only objects 12 and 14 are visible in this forward view. Horizon line 24 separates the displayed view of the sky from the earth's surface, represented by scaled grid lines 26. Those with skill in the art of the invention will readily see a variety of other possible means for displaying this out-the-window view. For example, a plurality of scaled lines indicating ground distance may be used, or a pair or larger number of lines tending toward a vanishing point.

The advantage of a helmet mounted display in this view is that, as the pilot rotates the helmet by moving his head, the view can rotate and change to approximate an actual view from the aircraft.

Refinements to the configuration three view may include varying the sized of displayed objects or using other methods of indicating to the pilot relative distances and positions of objects. The border may remain square, or may be transformed into a circular or any shape that may more accurately convey to the viewer the nature of the view.

Figure 9:
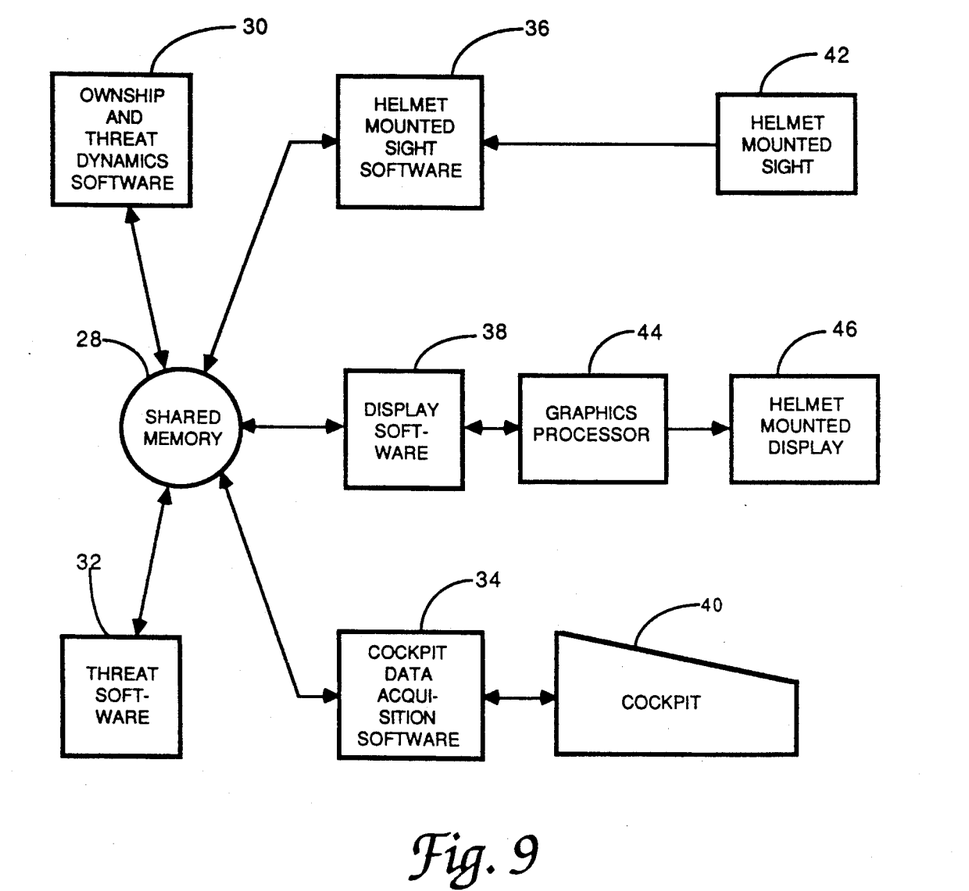
FIG. 9 shows an example hardware block diagram for an aircraft mounted system for generating the example display; and, FIG. 10 shows an example software block diagram, for the aircraft mounted hardware system of FIG. 9, for generating a display according to the teachings of the present invention.

FIG. 9 shows an example hardware block diagram for an aircraft mounted system for generating the example display. Shared memory 28 is both written to and read from by separate conventional software processors, or computers, 30, 32, 34, 36 and 38. The processors are ownship and threat dynamics software processor 30, threat software processor 32, cockpit data acquisition software processor 34, helmet mounted sight software processor 36, and display software processor 38. Cockpit data acquisition software processor 34 exchanges data with cockpit 40. Helmet mounted sight software processor 36 receives positioning and other data from helmet mounted sight 42. Display software processor 38 exchanges data with conventional graphics processor 44 which, in turn, provides a display signal to helmet mounted display 46. Not shown in this figure is the input of sensor data from radar and other sensor devices, preprocessed in some cases, to processors 30 and 32.

Figure 10:
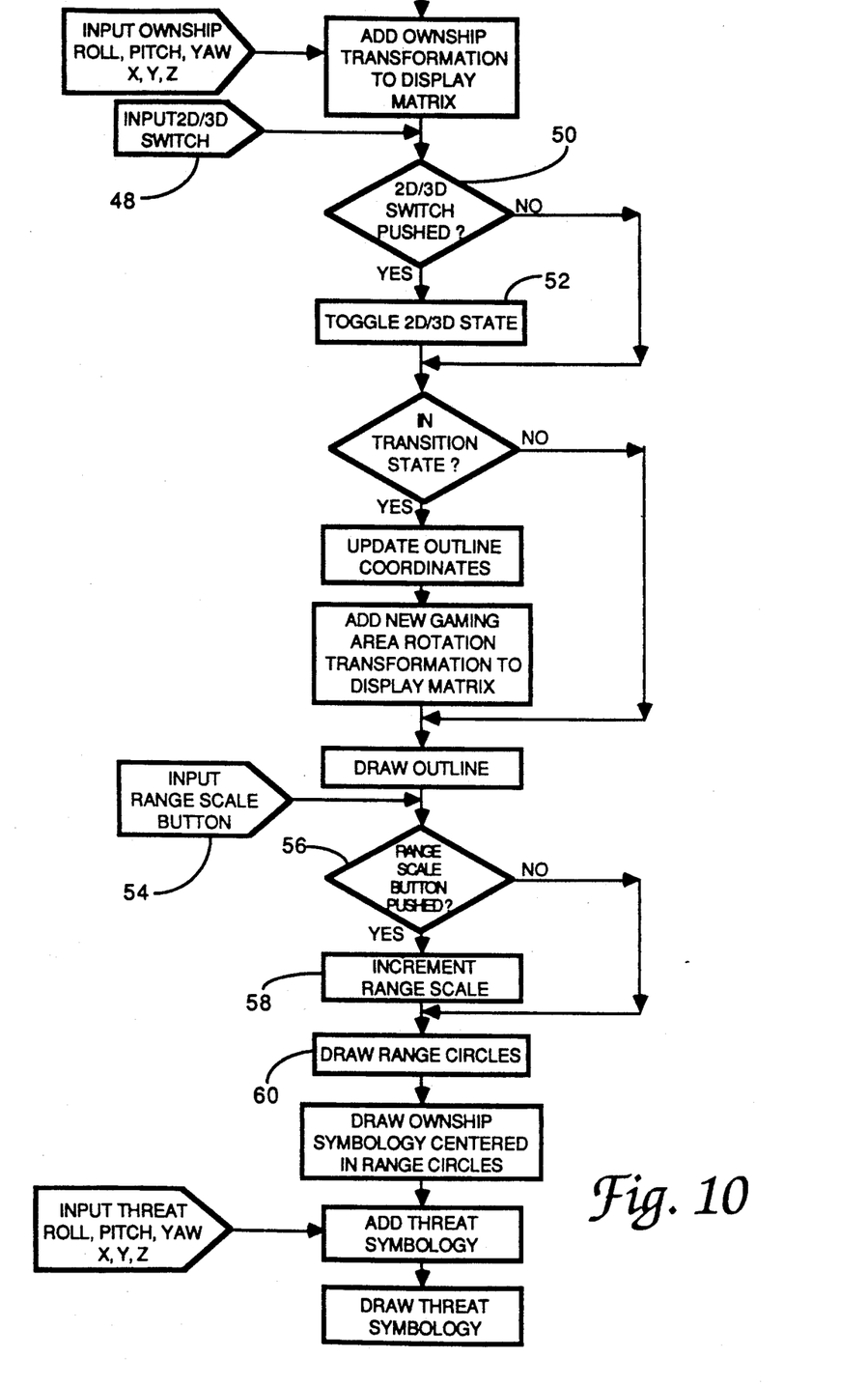

FIG. 10 shows an example software block diagram, for the aircraft mounted hardware system of FIG. 9, for generating a display according to the teachings of the present invention. The software of FIG. 10 resides primarily in display software processor 38 and uses data processed by the other processors and supplied to shared memory 28. The FIG. 10 software provides a toggle between a configuration one, or 2D, view and a configuration two, or 3D, view, by the use of a momentary push switch input, as shown in software blocks 48, 50 and 52. Those with skill in the art will readily see that the simple momentary push switch may be replaced by a two position switch that, with appropriate software, will toggle the view toward a particular view chosen from more than two views. Software blocks 54, 56, 58 and 60 demonstrate example additional features such as pilot-initiated variable range scales.

The entire display format may also be refined by changing the views slightly to better accommodate different uses. For some use, for example, the display might be better understood by using isometric perspective views instead of vanishing point perspectives.

A further refinement may include having the displayed aircraft symbol incline to indicate when the aircraft is either climbing or descending. This will convey information concerning climb, or even rate of climb, more quickly than watching for changes in relative positions of objects. However, the inclination of an aircraft is an parameter which the pilot will generally already be very aware of, and adding it to the display may add clutter and hamper the object of displaying only most useful information.

Those with skill in the art will see that the transformation to a configuration three view may start from any of a configuration one, a configuration two or an in-between view. The pilot controlled switch, or other control means for initiating transformations among views, may permit a variety of different choices, selection procedures, speeds, etc. by any of a large number of methods known in the art.

It will also be seen by those with skill in the art that the display format of the present invention may include fewer than all three disclosed view configurations. For some uses only a choice of two configurations may be required. For example, a pilot without a HMD may use only view configurations one and two. For a further example the lead pilot for a formation of aircraft about to enter group air-to-air combat may best use only view configurations one and three. The top-down configuration one view enables a quick sorting of targets for assignment by the lead pilot to the other pilots, followed by a configuration three view for dogfighting aided by the extended detection rang of aircraft sensors.

Those with skill in the art will additionally see that when used in a ground-based display, such as for air traffic control or for guiding a remotely piloted vehicle, the invention provides a very efficient display for integrating, for the operator, information from many sources, whether or not from ground or air based sensors.

The disclosed display format successfully demonstrates the use of controllably transforming among a variety of separate, primarily three dimensional perspective, views to provide a pilot, or other observer, a complete awareness of the entire surrounding three dimensional tactical situation. Although the disclosed use is specialized, it will find application in other areas where large amounts of information may be computer processed to be displayed in a manner that most effectively conveys the information.

It is understood that other modifications to the invention as described may be made, as might occur to one with skill in the field of the invention. Therefore, all embodiments contemplated have not been shown in complete detail. Other embodiments may be developed without departing from the spirit of the invention or from the scope of the claims.

We claim:

1. A method for displaying on a flat image display the position of a primary object relative to one or more other objects in three dimensional space, comprising the steps of transforming, under control of an operator, among a plurality of generally three dimensional perspective views in substantially unbroken steps.

2. The display method according to claim 1, the display having top, down, forward and behind directions, and the primary object having a front end, wherein the views include:
   (a) a generally top-down first view from above the primary object showing the primary object generally at the center of said first view surrounded by the one or more other objects, wherein the displayed positions of the one or more other objects automatically change in response to rotation of the primary ob to maintain front-forward direction of the primary object in said first view;

(b) a generally behind-forward perspective second view from behind the primary object showing the primary object generally at the center of said second view surrounded by the one or more other objects, wherein the displayed positions of the one or more other objects automatically change in response to rotation of the primary object to maintain a front-forward orientation of the primary object in said second view; and, (c) a generally inside-out third view from the primary object at the center of said third view showing those one or more other objects surrounding the primary object that are generally inside a solid angle defined by said third view, wherein the displayed positions of the one or more other objects change, under operator control of an apparent viewing orientation, so that said third view approximates an actual view from the primary object.

3. A flat image display apparatus for showing to an operator the position, in three dimensional space, of a primary object relative to one or more other objects, comprising:

(a) means for generating a generally top-down first view from above the primary object, showing the primary object generally at the center of the first view surrounded by the one or more other objects;

(b) means for generating a generally behind-forward perspective second view from behind the primary object, showing the primary object generally at the center of the second view surrounded by the one or more other objects;

(c) means for generating transition views intermediate between the first and second views;

(d) means responsive to operator input for changing between the first and second views, wherein the views are transformed from one to the other in substantially continuous transition steps; and, (e) wherein each generating means includes means for automatically altering the views in response to rotation of the primary object to maintain a front-forward orientation of the primary object.

4. The display apparatus according to claim 3, further comprising means for generating border lines for defining boundaries of a view.

5. The display apparatus according to claim 4, further comprising means for generating concentric range circles in the plane of a defined boundary for indicating relative radial distances among the primary object and the one or more other objects.

6. The display apparatus according to claim 5, wherein the plane of the generated range circles represents the surface of the ground.

7. The display apparatus according to claim 5, further comprising means for generating radial lines from a center of the concentric range circles to each of a point of projection from each of the primary object and the one or more other objects onto the plane of the range circles.

8. The display apparatus according to claim 5, wherein the generated range circles are scaled to represent actual distances.

9. The display apparatus according to claim 4, further comprising means for generating parallel range lines, wherein one range line each connects the primary object and the one or more other objects to the plane of a defined boundary for indicating relative distances among the primary and the one or more other objects.

10. The display apparatus according to claim 9, wherein the generated range lines are scaled to represent actual distances.

11. A flat image display apparatus for showing to an operator the position, in three dimensional space, of a primary object relative to one or more other objects, comprising:

(a) means for generating a generally top-down first view from above the primary object, showing the primary object generally at the center of the first view surrounded by the one or more other objects;

(b) means for generating a generally behind-forward perspective second view from behind the primary object, showing the primary object generally at the center of the second view surrounded by the one or more other objects;

(c) means for generating a generally inside-out third view from the primary object at the center of the third view, showing those one or more other objects surrounding the primary object that are generally inside a solid angle defined by the third view;

(d) means for generating transition views intermediate between first, second and third views;

(e) means responsive to operator input for changing among the first, second and third views, wherein the views are transformed from one to the other in substantially continuous transition steps; and, (f) wherein each generating means includes means for automatically altering the views in response to rotation of the primary object to maintain a front-forward orientation of the primary object.

12. The display apparatus according to claim 11, further comprising means for generating border lines for defining boundaries of a view.

13. The display apparatus according to claim 12, further comprising means for generating concentric range circles in the plane of a defined boundary for indicating relative radial distances among the primary object and the one or more other objects.

14. The display apparatus according to claim 13, wherein the plane of the generated range circles represents the surface of the ground.

15. The display apparatus according to claim 13, further comprising means for generating radial lines from a center of the concentric range circles to each of a point of projection from each of the primary object and the one or more other objects onto the plane of the range circles.

16. The display apparatus according to claim 12, further comprising means for generating parallel range lines, wherein one range line each connects the primary object and the one or more other objects to the plane of a defined boundary for indicating relative distances among the primary and the one or more other objects.

17. The display apparatus according to claim 11, further comprising means for automatically altering the third view in response to rotation of a part of the display apparatus.

18. The display apparatus according to claim 17, wherein said part of the display apparatus is a helmet mounted display worn by a pilot-operator and the primary object is an aircraft piloted by the pilot-operator, so that the third view approximates an actual view by the pilot-operator from the aircraft.

* * * * *